United States Patent [19]
Keba et al.

[11] Patent Number: 5,943,378
[45] Date of Patent: Aug. 24, 1999

[54] DIGITAL SIGNAL CLOCK RECOVERY

[75] Inventors: James Michael Keba, Wellington; Clinton C. Powell, II, Lake Worth, both of Fla.

[73] Assignee: Motorola, Inc., Schaumburg, Ill.

[21] Appl. No.: 08/691,081

[22] Filed: Aug. 1, 1996

[51] Int. Cl.[6] .................................................. H04L 7/00
[52] U.S. Cl. .......................................... 375/373; 375/360
[58] Field of Search .................................... 375/355, 371, 375/373, 360; 327/141

[56] References Cited

U.S. PATENT DOCUMENTS

| | | | |
|---|---|---|---|
| 4,769,816 | 9/1988 | Hochstadt et al. | 375/329 |
| 4,977,582 | 12/1990 | Nichols et al. | 375/371 |
| 5,208,833 | 5/1993 | Erhart et al. | 375/364 |
| 5,259,005 | 11/1993 | LaRosa et al. | 375/355 |
| 5,295,155 | 3/1994 | Gersbach et al. | 375/293 |
| 5,436,937 | 7/1995 | Brown et al. | 375/376 |
| 5,528,634 | 6/1996 | Criph et al. | 375/355 |
| 5,654,987 | 8/1997 | Nakamura | 375/355 |

*Primary Examiner*—Tesfaldet Bocure
*Attorney, Agent, or Firm*—James A. Lamb

[57] ABSTRACT

A clock recovery circuit for recovering a symbol clock (226) includes a level decoder (210) for determining one of a plurality of received states of a demodulated signal (105) during each symbol period of the symbol clock (226). Each of the plurality of received states corresponds to one of at least two modulation levels. The level decoder (210) generates for each of the plurality of received states a sign signal (212) having transitions at central threshold transition times and a magnitude signal (211). An edge selector (220) determines selected central threshold transition times. A synchronizable clock (225) is synchronized by the selected central threshold transition times, resulting in a significant reduction of symbol clock (226) jitter.

15 Claims, 7 Drawing Sheets

DIGITAL SIGNAL CLOCK RECOVERY

RELATED APPLICATIONS

Application Ser. No. 08/401,467 filed Mar. 9, 1995, by Carsello, entitled "Selective Call Receiving Device with Improved Symbol Decoding and Automatic Frequency Control."

FIELD OF THE INVENTION

This invention relates in general to electronic circuits for demodulating a digital signal and in particular to circuits for recovering a synchronized clock from a digital signal which includes multilevel symbols.

BACKGROUND OF THE INVENTION

In digital signal receivers that receive synchronous digital signals, a symbol clock must be synchronized with the digital signal in order to recover information from the digital signal with minimal errors. Known means of synchronizing a symbol clock in a digital signal receiver include adjusting the symbol clock using zero crossing edges or stochastic gradient statistical techniques.

The zero crossing technique is widely used and quite simple, required only a few logic gates, or alternatively, programmed instructions and microprocessor cycles. However, when it is used with typical multilevel signals, timing phase jitter of the symbol clock is typically introduced by intersymbol interference caused by pre-transmission filtering or channel filtering characteristics. The intersymbol interference introduces the jitter into these zero crossing recovery circuits even when no noise has been introduced into the signal.

The stochastic gradient technique has been used in digital radio systems. A stochastic gradient technique described in U.S. patent application Ser. No. 08/401,467 filed Mar. 9, 1995, by Carsello, entitled "Selective Call Receiving Device with Improved Symbol Decoding and Automatic Frequency Control" works quite well, without introducing significant timing phase jitter. However, the technique is more sophisticated and requires significantly more logic circuits when implemented with hardware, or alternatively, requires significantly more programmed instructions and microprocessor cycles when implemented in software, than a zero crossing technique. Such additional complexity is appropriate in receivers that are designed using more advanced circuitry for other purposes, but may be inappropriate in simpler receivers.

Thus, what is needed is a technique that is simple to implement and which reduces timing phase jitter when compared to prior art techniques.

DETAILED DESCRIPTION OF THE DRAWINGS

Figure 1:
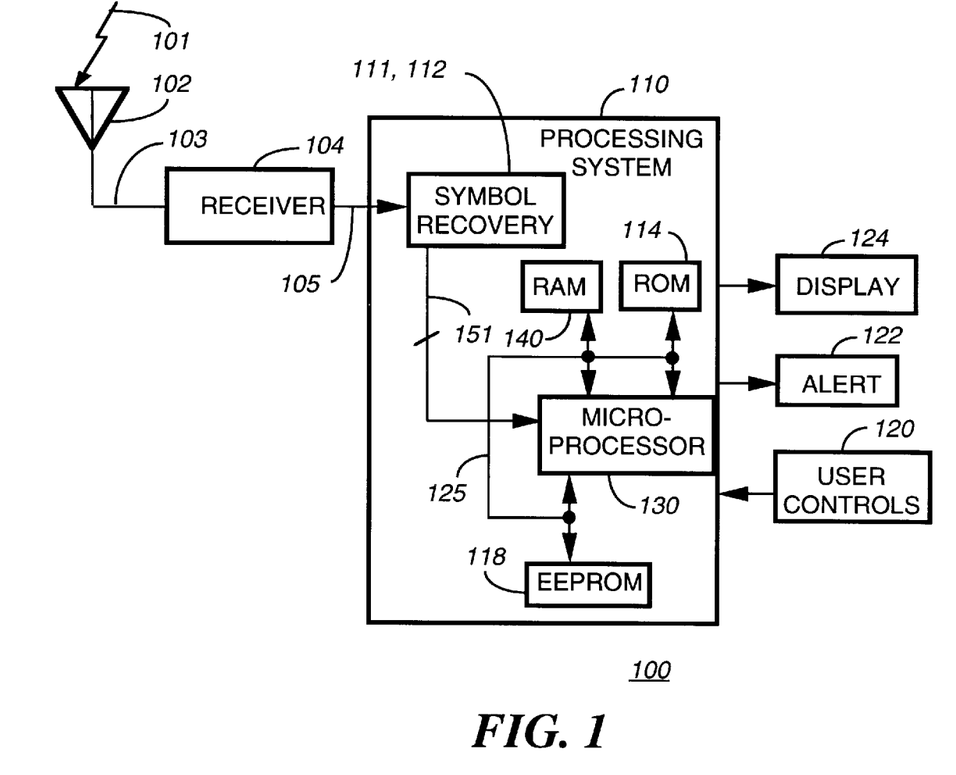
FIG. 1 is an electrical block diagram of a selective call radio, in accordance with the preferred and a prior art embodiment of the present invention.

Referring to FIG. 1, an electrical block diagram of a selective call radio 100 is shown, in accordance with the preferred and a prior art embodiment of the present invention. The selective call radio 100 includes an antenna 102 for intercepting a radiated signal 101 and converting it to a conducted radio signal 103. The radiated signal 101 is a radio signal that has been modulated with a sequence of multilevel digital symbols, each having an equal symbol period. The radio signal 101 is modulated at one of a plurality of modulation levels during each symbol period, with the modulation level being determined by the value of the multilevel digital symbol in the sequence during each symbol period. The modulation adds information to the radiated signal, including a message. In accordance with the preferred embodiment of the present invention, each multilevel digital symbol has one of four values, represented by one of four modulation levels. The antenna 102 is coupled to a conventional receiver element 104 wherein the conducted radio signal 103 is received. Receiving includes filtering to remove undesirable energy at off channel frequencies, amplification of the filtered signal, frequency conversion of the signal 103, and demodulation of the conducted radio signal 103 in a conventional manner. The receiver element 104 thereby generates a demodulated signal 105 that is coupled to a processing system 110. The demodulated signal is an analog signal representative of the modulation levels used to modulate the radio signal, but typically having been altered by distortion and noise, in a manner well known to one of ordinary skill in the art. The processing system 110 is coupled to a display 124, an alert device 122, and a set of user controls 120. The processing system 110 comprises a microprocessor 130 which is coupled by a bidirectional address and data bus 125 to symbol recovery section 112, a random access memory (RAM) 140, a read only memory (ROM) 114, and an electrically erasable programmable read only memory (EEPROM) 118. The demodulated signal 105 is coupled to the symbol recovery section 112, which converts the demodulated signal from the analog signal to a parallel digital signal 151 comprising a recovered symbol clock and a sequence of at least two parallel symbol bits, for processing by the processing system 110. The parallel digital signal 151 is coupled to an input port of the microprocessor 130. The recovery of the symbol clock is accomplished using a unique technique, as described in more detail below.

A message processor function decodes and processes the information in the radiated signal when an address received in radiated signal matches an embedded address stored in the EEPROM 118. A message that has been determined to be for the selective call radio 100 by the address matching is processed by the message processor function according to the contents of the outbound message and according to modes set by manipulation of the set of user controls 120, in a conventional manner. An alert signal is typically generated when an outbound message includes user information. The alert signal is coupled to the alert device 122, which is typically either an audible or a silent alerting device.

When the message includes alphanumeric or graphic information, the information is displayed on the display 124 in a conventional manner by a display function at a time determined by manipulation of the set of user controls 120.

The RAM 140 and the EEPROM 118, are preferably conventional parts. The ROM 114 is preferably a conventional part having a conventional set of masked program instructions for performing the message processing functions described above. Preferably, the microprocessor 130 is a microprocessor in the family of 68HC11 microprocessors manufactured by Motorola, Inc. It will be appreciated that other similar processors can be utilized for the microprocessor 130, and that additional processors of the same or alternate type can be added as required to handle the processing requirements of the processing system 110. It will be appreciated that other types of memory, e.g., ultraviolet erasable programmable read only memory (UVEPROM) or flash ROM, can be alternatively utilized for the ROM 114, as well as the RAM 140. It will be further appreciated that the RAM 140, the EEPROM 118 and the ROM 114, singly or in combination, can be integrated as a contiguous portion of the microprocessor 130.

It will be appreciated that the processing system can be alternatively implemented without the microprocessor 130, by implementing the conventional and unique functions described herein with a combination of conventionally available off the shelf integrated circuits such as CMOS shift registers, clocks, gates, counters, DAC, ADC, and RAM, and further, that some or all of the conventionally available off the shelf integrated circuits used to implement the processing system can be alternatively implemented in an application specific integrated circuit.

Figure 2:
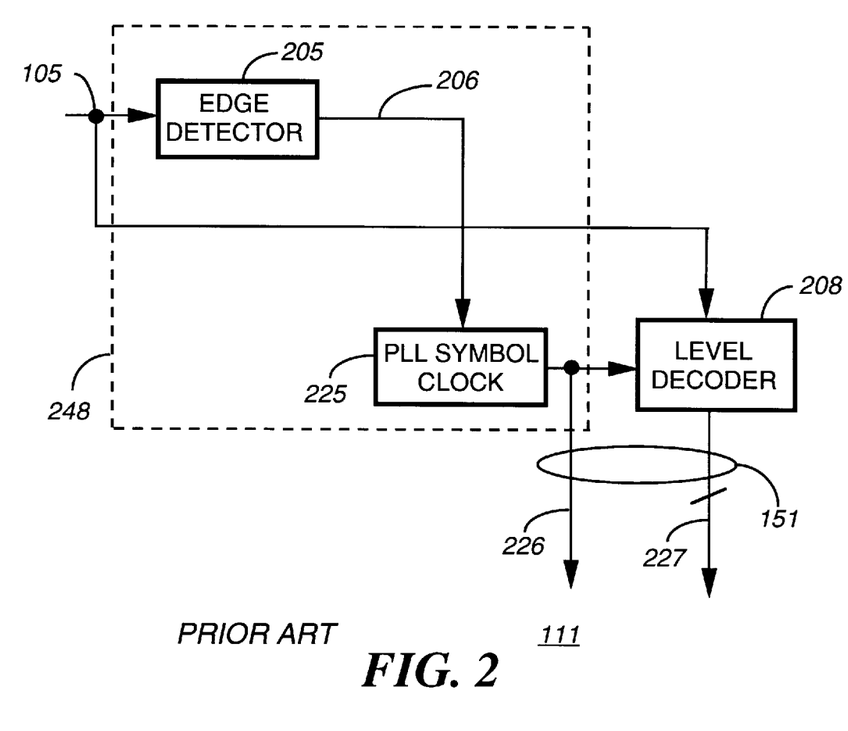
FIG. 2 is an electrical block diagram of a typical prior art symbol recovery section of the selective call radio shown in FIG. 1.

Referring to FIG. 2, an electrical block diagram of a typical prior art symbol recovery section 111 of the selective call radio 100 is shown. The prior art symbol recovery section 111 comprises an edge detector 205, a phase lock loop (PLL) clock 225, and a level decoder 208, all of which are conventional circuits. The demodulated signal 105 is coupled to the edge detector 205, which generates a pulse in edge signal 206 that is high for a short time whenever the demodulated signal 105 exhibits an edge. The edge signal 206 is coupled to the PLL symbol clock 225, which is a synchronizable clock. The PLL symbol clock 225 uses the edge signal 206 to adjust the phase of the symbol clock signal 226 based on the pulses of the edge signal 206, in a conventional manner, optimizing the symbol clock to have its positive edges near the center of each symbol period. The symbol clock signal 226 and the demodulated signal 105 are coupled to the level decoder 208, which generates a parallel binary signal 227 from the demodulated signal 105. The parallel binary signal identifies to which of several nominal receive levels the analog value of the demodulated signal is closest at each positive edge of the symbol clock signal 226. A prior art clock recovery element 248 comprises the edge detector 205 and the PLL symbol clock 225.

Figure 3:
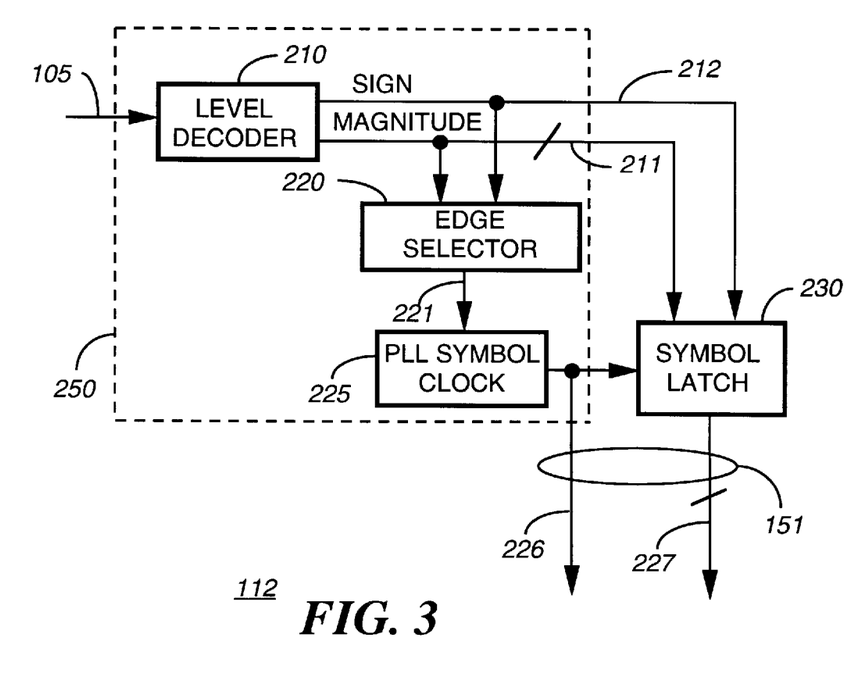
FIG. 3 is an electrical block diagram of a symbol recovery section of the selective call radio shown in FIG. 1, in accordance with the preferred embodiment of the present invention.

Referring to FIG. 3, an electrical block diagram of the symbol recovery section 112 of the selective call radio 100 is shown, in accordance with the preferred embodiment of the present invention. The symbol recovery section 112 comprises a level decoder 210, an edge selector 220, the PLL clock 225, and a symbol latch 230. The demodulated signal 105 is coupled to the level decoder 210, which generates sets of parallel binary signals 211, 212 that are determined from the value of the analog signal. The sets of parallel binary signals 211, 212 are preferably generated continuously, by an analog level decoder 210, but may alternatively be generated by an oversampled level decoder 210 which is oversampled at a clock rate at least equivalent to an oversample clock rate used in the edge selector 220, described herein below. It will be appreciated that therefore a plurality of sets of parallel binary signals 211, 212 are generated each symbol period. A clock recovery element 250 comprises the level decoder 210, the edge selector 220, and the PLL clock 225. In accordance with the preferred embodiment of the present invention, the modulation is four level and the set of parallel binary signals 211, 212 is a set of two binary signals, which when considered as a set have four states that are possible. The set of parallel binary signals 211, 212 are also referred to as the received states 211, 212 of the digital symbols. The received states 211, 212 have a one to one correspondence with one of four demodulation ranges within which the value of the analog signal 105 falls at any given time, and the four demodulation ranges correspond to four nominal receive levels and the four modulation levels. Table 1 shows these values for the symbol recovery section 112 in accordance with an example of the preferred embodiment of the present invention. The demodulation ranges are characterized in this example by threshold values of +2.0 volts, 0 volts, and −2.0 volts, which are used to determine received states. The four nominal receive levels are evenly spaced, in this example 2.0 volts apart, and are symmetrically spaced with respect to a central threshold value, which in this example is the zero volt threshold. Other examples of central threshold values known to one of ordinary skill in the art are one half battery voltage, and a one half peak plus valley threshold.

TABLE 1

| Modulation level (hertz) | Demodulation range (volts) | Nominal receive level (volts) | Binary states (Received states) |
| --- | --- | --- | --- |
| −4800 | −4.0 to −2.0 | −3.0 | 00 |
| −1600 | −2.0 to 0 | −1.0 | 01 |
| +1600 | 0 to 2.0 | +1.0 | 11 |
| +4800 | 2.0 to 4.0 | +3.0 | 10 |

It will be appreciated that in this example the most significant bit of the binary states (the left most state in the "Binary states" column of Table 1) indicates the signum, or sign of the demodulation signal 105. The sign signal 212 couples this sign bit to the edge selector 220 and the symbol latch 230. A zero crossing transition time is the time at which the sign signal 212 changes state. The zero crossing transition time is alternatively described as a central threshold transition time. The bits other than the most significant bit of the received states indicate the magnitude of the demodulation signal 105. In this example in accordance with the preferred embodiment, there is only one bit other than the sign bit. In other embodiments, there are additional bits that indicate the magnitude of the demodulation signal 105. Also, in other embodiments, the sign bit is not the most significant bit. However, in all embodiments, one bit is an indication of the whether the value of the signal is less than or greater than the central threshold value. The magnitude signal 211 couples these magnitude bit(s) from the level decoder 210 to the edge selector 220 and the symbol latch 230. The edge selector 220 uses the sign and magnitude signals 211, 212 to select zero crossing transition times that are coupled to the PLL clock 225. The selected transition times are zero crossing transition times that meet a predetermined criterion based on the magnitude signal. The PLL clock 225 generates a recovered symbol clock signal 226, which is synchronized by the selected transition times, thereby optimizing the symbol clock to have its positive edges near the center of each symbol period. The use of an edge signal 221 comprising the selected transition times synchronizes the symbol clock with less jitter than in the prior art symbol recovery section 111 described with reference to FIG. 2. The recovered symbol clock signal 226 is coupled to the symbol latch 230 and also forms a portion of the parallel digital signal 151. The symbol latch 230 latches (maintains a constant output state of) the received states 211, 212 during each symbol period as determined by the recovered symbol clock signal 226, generating a sequence of two binary signals 227 representing the recovered sequence of digital symbols, which forms a portion of the parallel digital signal 151.

Figure 4:
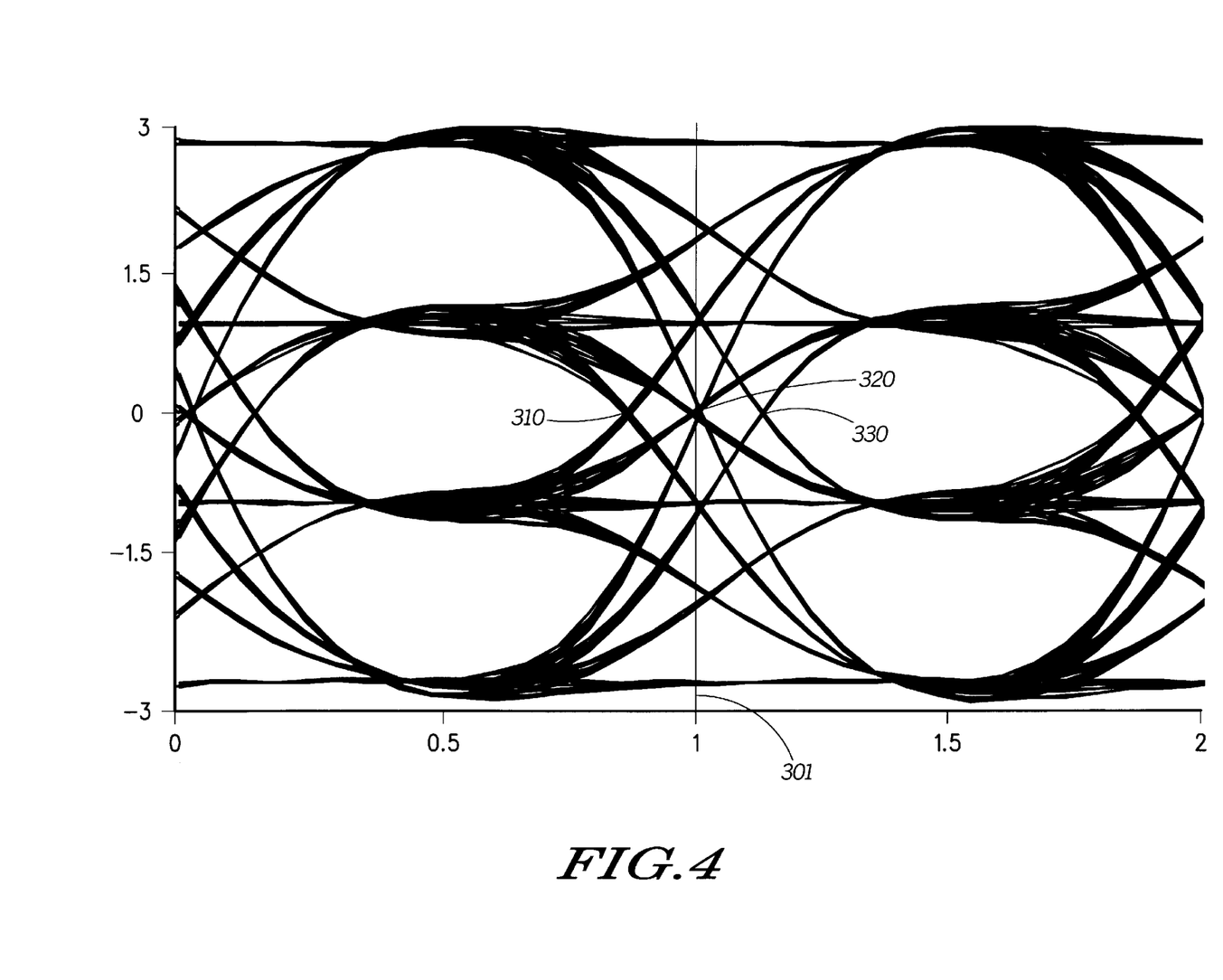
FIG. 4 is a diagram of an eye pattern waveform and associated zero crossing transition times of a signal received with essentially no noise, in accordance with the preferred embodiment of the present invention.

FIG. 4 is a diagram of an eye pattern waveform and associated zero crossing transition times for the demodulated signal 105 when there is essentially no noise, in accordance with the preferred embodiment of the present invention. The vertical axis of FIG. 4 represents the voltage of the demodulated signal 105, while the horizontal axis shows the phase of the demodulated signal, in symbol periods, relative to an ideal central reference transition time 301. As a result of premodulation filtering (which is FM splatter filtering, in accordance with the preferred embodiment of the present invention) applied to the modulation levels prior to modulation of the radio signal, inter symbol interference (ISI) occurs. An artifact of the ISI is multiple zero crossings in the recovered data, which are easily observed in an eye pattern waveform, as is well known to one of ordinary skill in the art. In FIG. 4, there are twelve state change curves observable, which are listed in Table 2. The state change curves represent the analog voltages of the demodulated signal 105 when all possible data symbol sequences are included in the radiated signal 101. The state change curves are identified by starting and ending nominal receive levels (also referred to as peak and valleys) of the symbols they represent and by the binary states (received states) through which they pass. The starting nominal receive level is at time 0.5 symbol periods, and the ending nominal receive level is at time 1.5 symbol periods in FIG. 4.

TABLE 2

| Starting and ending nominal receive levels (volts) | Binary states (Received states) (The most significant bit is at the left) | Zero crossing transitions (reference FIG. 4) |
| --- | --- | --- |
| +3.0 to +1.0 | 10 to 11 | |
| +1.0 to +3.0 | 11 to 10 | |
| +3.0 to −1.0 | 10 to 11 to 01 | 330 |
| −1.0 to +3.0 | 01 to 11 to 10 | 310 |
| +3.0 to −3.0 | 10 to 11 to 01 to 00 | 320 |
| −3.0 to +3.0 | 00 to 01 to 11 to 10 | 320 |
| +1.0 to −1.0 | 11 to 01 | 320 |
| −1.0 to +1.0 | 01 to 11 | 320 |

TABLE 2-continued

| Starting and ending nominal receive levels (volts) | Binary states (Received states) (The most significant bit is at the left) | Zero crossing transitions (reference FIG. 4) |
| --- | --- | --- |
| +1.0 to −3.0 | 11 to 01 to 00 | 310 |
| −3.0 to +1.0 | 00 to 01 to 11 | 330 |
| −1.0 to −3.0 | 01 to 00 | |
| −3.0 to −1.0 | 00 to 01 | |

Some state change curves generate intermediate states as they change from their starting to ending nominal levels. The duration of the intermediate received states will typically be quite short, for example, ⅛ of a symbol period or less. Zero crossing transitions 310, 320, 330 of the state change curves occur when the analog value of the demodulated signal 105 passes through zero volts. State change curves having the zero crossing transitions (central threshold transitions) 310, 320, 330 are identified in the third column of Table 2 by the element numbers 310, 320, 330 of FIG. 4. The zero crossing transitions 320 occur substantially one half symbol period from the relative peaks of the analog values of the state change curves for which element number 320 appears in the third column in Table 2. "Substantially" is used to indicate that the relationship stated (one half symbol period from the relative peaks of the analog values of the state change curves) is exact or nearly exact when no noise is introduced into the radiated signal 101, and that the relationship becomes less exact on an individual basis as noise is introduced, but remains nearly exact when measured as an average of many such relationships when the noise is white noise. When this timing relationship occurs the transition time is an ideal transition time 301. The zero crossings 310, 330 occur at undesired transition times significantly before and after the ideal transition time 301.

In typical conventional symbol clock recovery elements, such as the circuit described above with reference to FIG. 2, the transition times of all the zero crossing transitions 310, 320, 330 are used to adjust the synchronizable symbol clock signal 226. While the symmetry of the time offsets of the undesired transition times of the zero crossings 310, 330 theoretically results in good synchronization of the symbol clock signal 226 over a long period of time, the effect of the use of the transition times of the zero crossings 310, 330 is to cause undesirable jitter of the symbol clock signal 226.

In accordance with the preferred embodiment of the present invention, only the transition times of the zero crossings 320 are selected for use to adjust the symbol clock signal 226, resulting in a more stable recovered symbol clock signal 226. The times at which zero crossings 320 occur in the demodulated signal 105 are hereinafter referred to as selected transition times. The selected transition times are zero crossing transition times (in this example, from 11 to 01, from 01 to 11, from 00 to 10, and from 10 to 00) for which the received states substantially one half symbol period before and after each of the selected transition times are of equal magnitude. It will be appreciated that the description "the received states substantially one half symbol period before and after each of the selected transition times" is important so that the determinations of the magnitudes of the received states are most reliably made near the peak and valleys of the analog signal. It will be further appreciated that the elimination of the zero crossing transitions 310, 330 leaves only the zero crossing transitions 320, which are very close to the ideal transition time 301, which results in essentially no jitter of the symbol clock signal 226 when there is no noise added into the signal 101. The performance when noise is added into the signal 101 is also better than prior art circuits, as will be described below.

In a variation to the preferred embodiment of the present invention, only the zero crossings of the state change curves having starting and ending nominal receive levels that do not include one or more small magnitudes are selected. For the example described above, only the zero crossings of the state change curves having starting and ending nominal receive levels of +3.0 and −3.0 volts are used. As an example of the more general case of a system using 8 level modulation, only zero crossings having the three largest magnitudes are used. The effect of such selection criteria is to further improve the jitter by using state change curves having greater slopes at the zero crossing transition times, at the expense of somewhat longer stabilization time.

It will be appreciated that the principal of selecting only those transition times that represent level crossings which occur substantially at the ideal transition time 301 applies to any receiver which recovers an analog signal which changes between nominal receive levels that represent modulation levels of multilevel digital symbols. One such receiver is a wireline receiver for recovering an analog signal which changes between nominal receive levels which are the same as the modulation levels used to generate the analog signal, when the analog signal is coupled by a direct wireline connection. Other examples are FM and AM radio receivers, fiber optic, and infrared light receivers.

It will be further appreciated that the number of levels in the multilevel signal can be any number as long as the number is at least two, but that the typical numbers encountered in digital transmission systems are four, eight, and sixteen. Further, it will be appreciated that the functions of the level decoder 210, edge selector 220, and the symbol clock 225 can be generalized as follows when the nominal receive levels are symmetrically and evenly spaced with respect to the central threshold value. The level decoder 210 is for determining a plurality of received states of the demodulated signal during each symbol period. Each of the received states corresponds to one of the at least two modulation levels. The level decoder 210 generates for each state a sign signal having transitions at zero crossing transition times and a magnitude signal. The edge selector 220 is for determining selected transition times. The synchronizable clock 225 is synchronized by the selected transition times and has a symbol period. The selected zero crossing transition times are zero crossing transition times for which the received states substantially one half symbol period before and after each of the selected transition times are of equal magnitudes.

Figure 5:
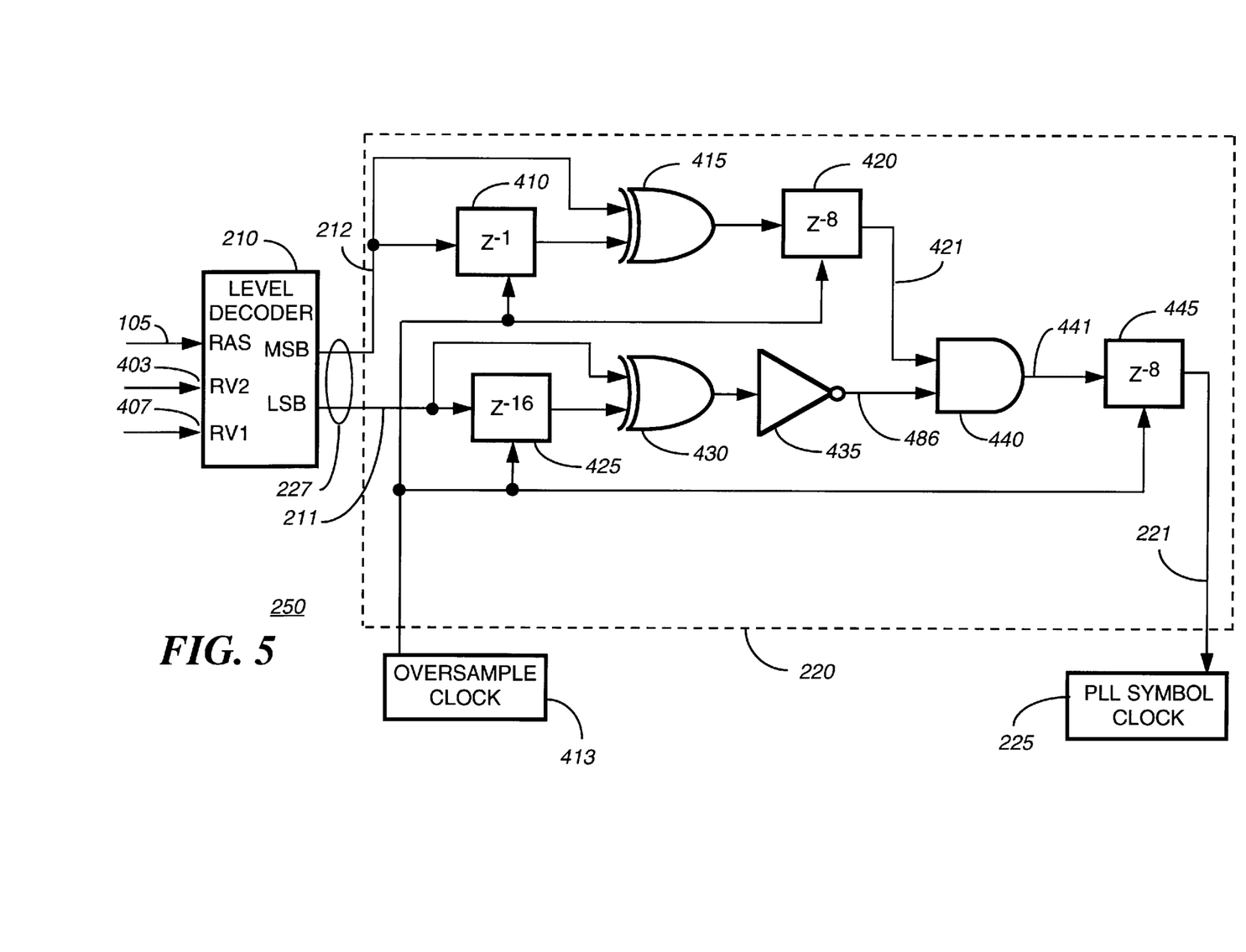
FIG. 5 is an electrical block diagram of a clock recovery element used in the symbol recovery section shown in FIG. 3, in accordance with the preferred embodiment of the present invention.

Referring to FIG. 5, a circuit diagram of the clock recovery element 250 used in the symbol recovery section 112 is shown, in accordance with the preferred embodiment of the present invention. The clock recovery element 250 comprises the level decoder 210, a one stage delay register 410, an oversample clock 413, two EXCLUSIVE OR gates 415, 430, two eight stage delay registers 420, 445, a sixteen stage delay register 425, an inverter 435, and a two input AND gate 440. The oversample clock 413 preferably generates an oversample clock signal having an oversample period which is one-sixteenth of the symbol clock period, although it will be appreciated by one of ordinary skill in the art that higher or lower oversampling rates could alternatively be used, such as 8 or 32, although lower rates may degrade the performance. The oversample clock signal is coupled to the three delay registers 410, 420, 425, and 455.

The analog signal 105 is coupled to an input of the level decoder 210. A −3.0 volt reference signal is coupled to input 407, and a +3.0 volt reference signal is coupled to input 403 of the level decoder 210. Using the reference signals to internally generate the threshold values −2.0 volts, 0 volts, and +2.0 volts, the level decoder 210 generates simultaneous binary signals 211, 212 from the analog signal 105 in accordance with the states shown in Table 1.

The binary signal 211 is coupled to an input of the sixteen stage delay register 425 and an input of the EXCLUSIVE OR gate 430. The output of the sixteen stage delay register 425 is coupled to a second input of the EXCLUSIVE OR gate 430. The output of the EXCLUSIVE OR gate 430 is coupled to an input of inverter 435. The output signal 486 of the inverter 435 is coupled to an input of the AND gate 440. The binary signal 212 is coupled to an input of the one stage delay register 410 and an input of the EXCLUSIVE OR gate 415. The output of the one stage delay register 410 is coupled to a second input of the EXCLUSIVE OR gate 415. The output of the EXCLUSIVE OR gate 415 is coupled to an input of the eight stage delay register 420, which generates a sample signal 421 that is coupled to a second input of the AND gate 440.

It will be appreciated by one of ordinary skill in the art that the sample signal 421 has high level pulses which have a duration of one sixteenth of a symbol period which occur at the middle of symbol periods after a zero crossing transition of the analog signal 105, which is a transition of the analog signal 105 from a value greater than zero to less than zero, or vice versa. When the sample signal 486 generated by the inverter 435 is used to gate the signal 421 by means of the AND gate 440, the result is the signal 441, which has high level pulses, each of which has a duration of one sixteenth of a symbol period, and each of which occurs at the middle of a symbol period after a zero crossing transition of the analog signal 105 when the nominal receive levels of the analog signal 105 at the middle of the symbol period and the middle of the previous symbol period are of opposite sign and equal magnitude. Thus, each high level pulse in signal 441 indicates a selected transition time which is a zero crossing transition time for which the received states substantially one half symbol period before and after the selected transition time are of equal magnitudes and opposite signs, with the indication occurring one half symbol period after the selected transition time. The signal 441 is coupled to the eight stage delay register 445, which delays the high level pulses to the next later zero crossing time, thereby generating the edge signal 221 comprising high level pulses (edge pulses) indicative of selected zero crossing transitions. The edge signal 221 is coupled to the PLL symbol clock 225, which synchronizes the symbol clock in response to each selected zero crossing transition. The PLL symbol clock 225 is identical to the PLL symbol clock used in prior art circuits, such as the clock recovery element 248. The level decoder 210, the logic gates 415, 430, 435, 440, the oversample clock 413, and the stages 410, 420, 425, 445 are conventional circuits.

It will be appreciated that alternative intercouplings of conventional logic gates can be used to achieve the same unique functions described herein. It will be further appreciated that the present invention is beneficial when adding the present invention to an existing receiver 100 while keeping existing integrated circuit portions of the receiver 100, because the level decoder 210 and edge selector 220 of the present invention can be added between the receiver element 104 and the PLL symbol clock 225, replacing the edge detector 205, without making changes to either the receiver element 104 or the PLL symbol clock 225. Also, in this situation the demodulated signal 105 can be left connected to the level decoder 208 of the existing circuits and the symbol latch 230 not used. In this alternative, the level decoder 208 acts as a latching device, as does the symbol latch 230 when it is used. Furthermore, the edge detector 205 can be retained and used to generate the sign signal 212, if desirable, for example, for a receiver redesign.

It will be further appreciated that the transition time of the sign and magnitude signals 211, 212 can be qualified prior to or during their generation by the level decoder to the same extent as done in some prior art devices, for example by the use of hysteresis or the selection of either all positive going central threshold transitions or all negative going central threshold transitions. In these cases, the prior art qualification does not use unique criteria used in accordance with the preferred and alternative embodiments of the present invention, which is a selection of central threshold transition times based on the magnitude signal, which represents the magnitude of the demodulation signal 105. When such unique criteria of the transition times are used, the clock recovery element 250 in accordance with the preferred embodiment of the present invention still provides the benefits of reduced jitter and simple implementation in comparison to a prior art clock recovery element 248 in which the edge detector generates the edge signal 206 using only the zero crossing transitions of the same predetermined direction.

It will be further appreciated that the sign signal 212 can be generated in a manner analogous to the generation of edge signals 206 used in some prior art clock recovery elements 248, wherein some hysteresis is introduced into the decision process in order to reduce false generation of edge pulses. The benefits of the present invention in comparison to the prior art are realized when hysteresis or other similar qualifications are used to generate the sign and magnitude signals, because these qualifications do not eliminate the undesired zero crossings 310, 330.

It will be further appreciated that the terminology "equal magnitude" implies magnitudes that are equal within the design tolerances of the circuits used to recover the magnitude values. Such tolerances include tolerances of the circuits that generate the threshold references, including the central, or zero, threshold reference, as well as the circuits that measure the value of the demodulated signal 105, and which may include least significant bit quantization errors.

It will be further appreciated that in a receiver 100 which is receiving a multilevel signal such as an eight or higher level modulated signal, it may be desirable to select zero crossing transitions not only of those transitions determined to be of equal magnitudes one half symbol before and after the transition time, but also of transitions which are determined to be of approximately equal magnitudes one half symbol before and after the transition times. By way of an example, assume an eight level signal is received, in which the levels are equally separated and have nominal receive values identified as −D, −C, −B, −A, +A, +B, +C, and +D which correspond to evenly spaced voltages from −3 volts to +3 volts (the same absolute maximum voltages used for the four level signal described with reference to FIG. 4). The corresponding evenly spaced voltages are: −3.00, −2.14, −1.29, −0.43, +0.43, +1.29, +2.14, and +3.00. Zero crossing transitions (−D, +D), (−C, +C), (−B, +B), and (−A, +A) will have transition times at the ideal transition time 301 such as shown in FIG. 4. Zero crossing transitions (−B, +D) and (+B, −D) will have offsets from the ideal transition time 301 approximately equivalent to the offsets 310, 330 of the four level signal described with reference to FIG. 4. Zero crossing transitions (−A, +D) and (+A, −D) will have offsets from the ideal transition time 301 greater than the offsets 310, 330. However, zero crossing transitions (−C, +D) and (+C, −D) will have offsets from the ideal transition time 301 less than the offsets 310, 330. It may be desirable in some situations to select the offsets (−C, +D) and (+C, −D) for use in synchronizing the symbol clock 225. This choice is one between additional jitter introduced by selecting them and faster synchronization lock time of the symbol clock 225, versus less jitter and slower synchronization lock time. In this example, the magnitudes of the reference levels used by the edge selector 220 to make the selection are approximately equal, in that they have an absolute reference level ratio of 2.14/3.00, or 0.713. In higher level systems, the selection criteria could include only those transitions between levels having higher absolute reference level ratios to increase the quantity of zero crossings used to synchronize the symbol clock while still substantially reducing jitter in comparison to prior art clock recovery circuits 248.

The uniqueness of the clock recovery element 250 includes two aspects of the invention; namely, the selection of zero crossing transition times which meet predetermined criteria to perform synchronization of a conventional phase lock loop or other synchronizable symbol clock, and the use of the magnitude signal to make the selection of the zero crossing transition times in a simple manner, using a small number of gates, as described with reference to FIG. 5, or a small number of program instructions, as described below with reference to FIG. 8.

Figure 6:
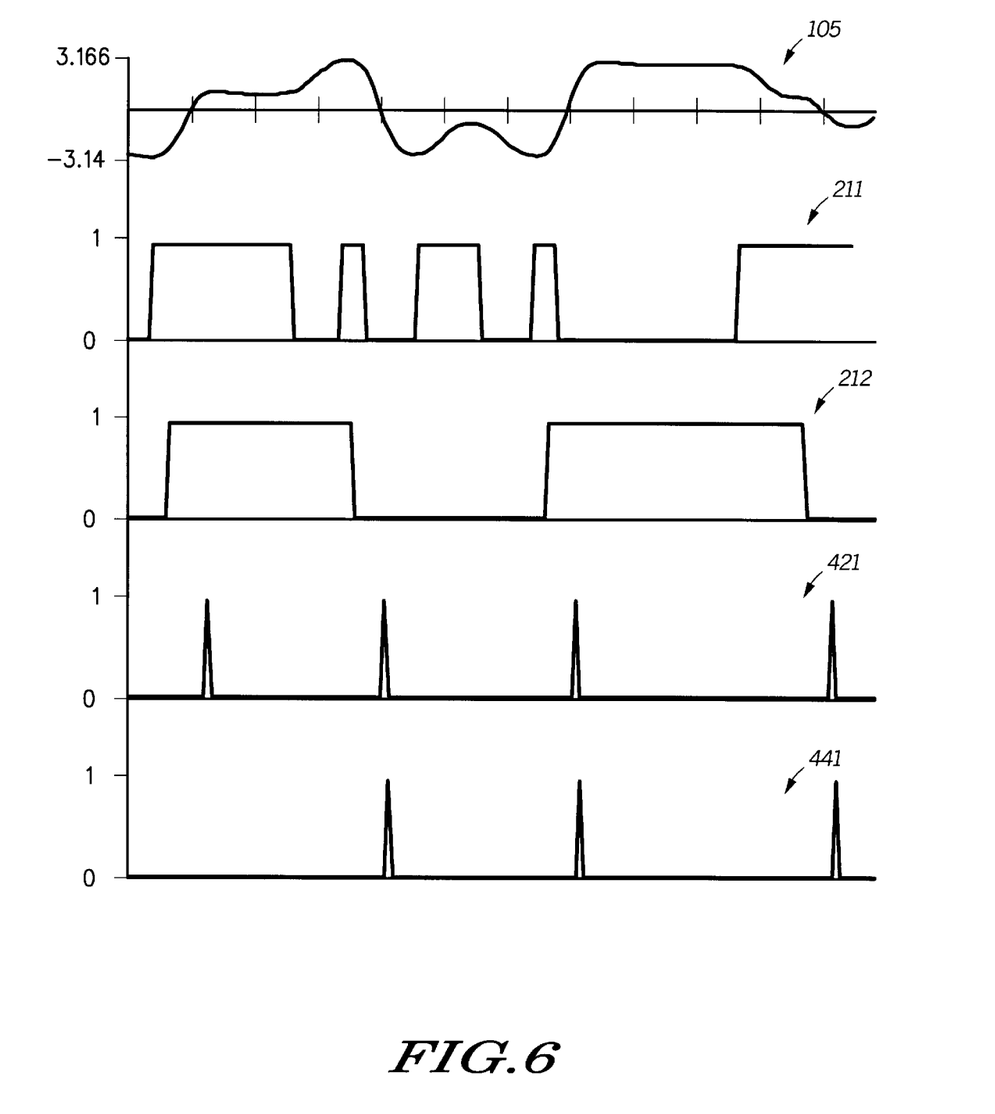
FIG. 6 is a timing diagram of waveforms generated by the clock recovery element in response to an example of a demodulated signal, in accordance with the preferred embodiment of the present invention.

Referring to FIG. 6, a timing diagram of waveforms generated by the clock recovery element 250 in response to an example of the demodulated signal 105 is shown, in accordance with the preferred embodiment of the present invention. The vertical axis of the example demodulated waveform 105 represents the voltage of the demodulated signal 105, while the horizontal is time, with symbol periods marked on the horizontal axis of the demodulated signal. The vertical axes of the waveforms 211, 212, 421, and 441 represent binary values of the signals. The signals 211, 212, 421, 441 described with reference to FIG. 5 are shown in FIG. 6 with values responsive to the example of the analog signal 105 also shown in FIG. 6.

Figure 7:
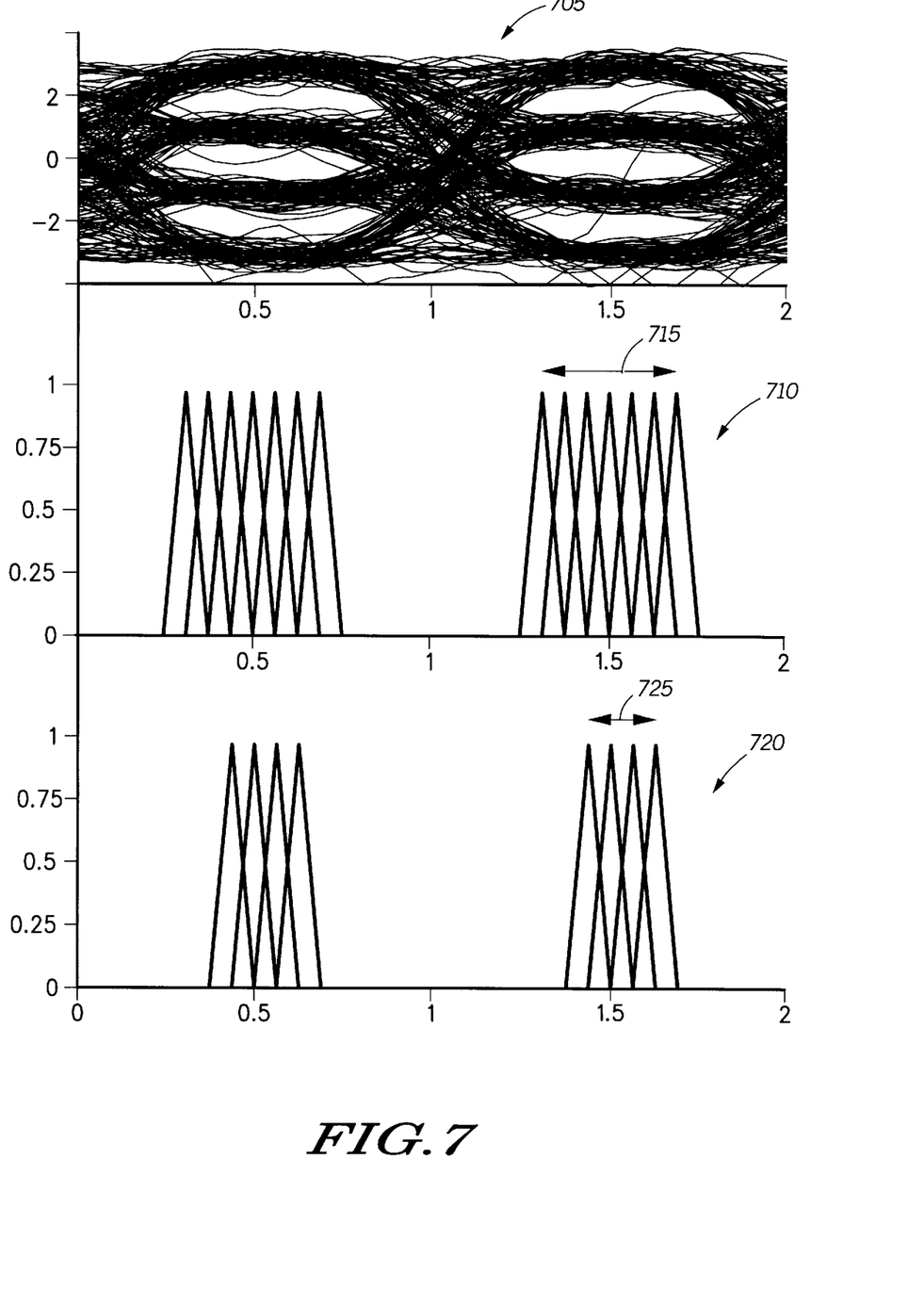
FIG. 7 is a diagram of an eye pattern waveform and associated zero crossing transition times of a signal received with noise, in accordance with the preferred embodiment of the present invention.

Referring to FIG. 7, a diagram of a simulated eye pattern waveform 705 and associated transition times for the demodulated signal 105 when there is a signal to noise ratio of 12 dB is shown, in accordance with the example of the preferred embodiment of the present invention described above with reference to FIGS. 3 and 4. The vertical axis of the eye pattern 705 represents the voltage of the demodulated signal 105, while the horizontal axis shows the phase of the demodulated signal, in symbol periods, relative to an ideal central reference transition time 301. The vertical axes of the signals 710, 720 represent binary values of the signals. The signals 710, 720 which represent the signal 226 for the prior art recovery clock element 248 and the signal 226 for the preferred embodiment of the clock recovery element 250 respectively, and simulated for a large plurality of symbol periods are illustrated on a symbol period scale equivalent to that used for the eye pattern waveform. The simulation results were obtained using Signal Processing WorkSystem®, which is electrical circuit simulation software distributed by Alta Group™ of Cadence Design Systems, Inc. of Foster City, Calif. The simulation shows that the range of jitter 725 of the signal 720 is substantially less than the range of jitter 715 of the signal 710. A similar reduction in jitter occurs at other noise levels.

Figure 8:
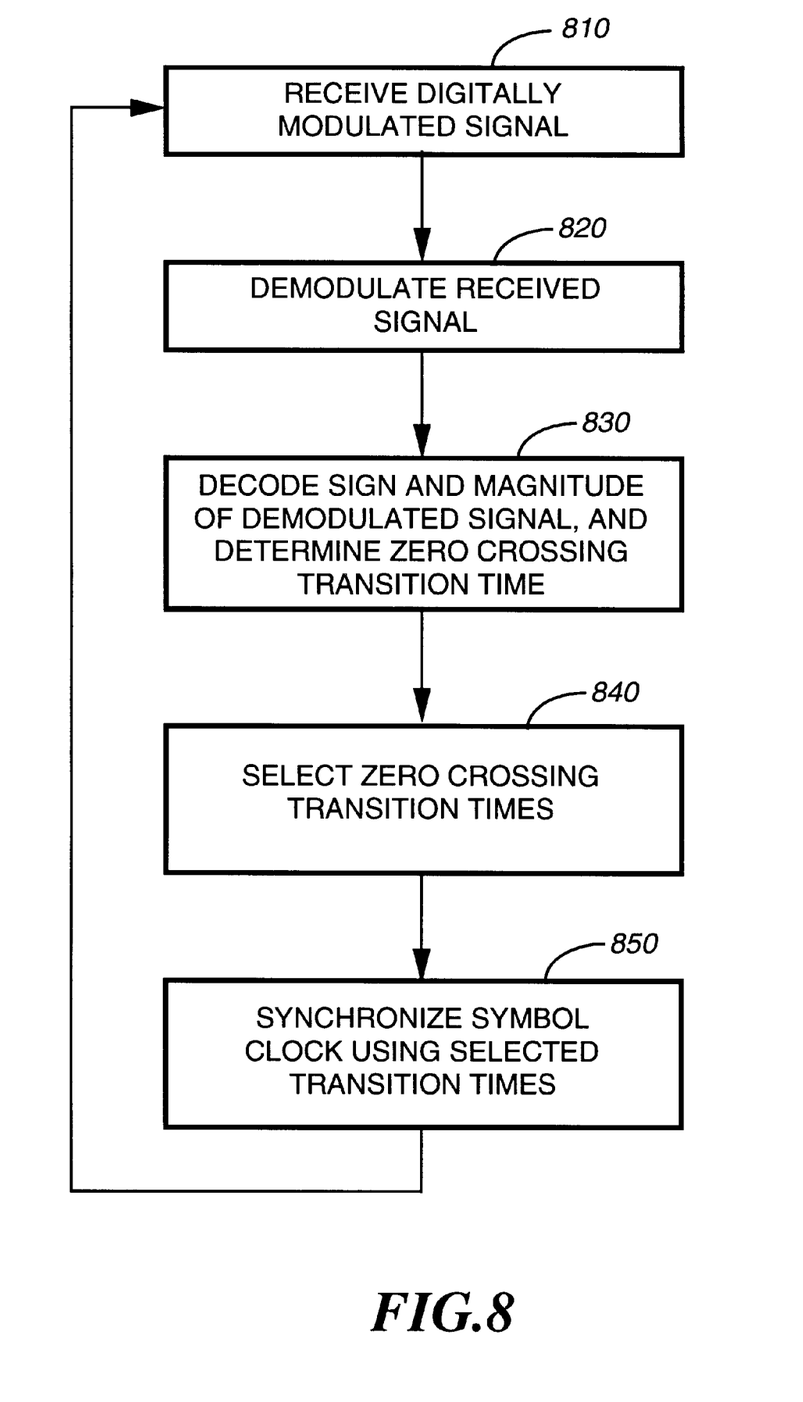
FIG. 8 is a flow chart of a method used in a processing system of a radio for accomplishing clock recovery, in accordance with the preferred embodiment and an alternative embodiment of the present invention.

Referring to FIG. 8, a flow chart of a method used in the processing system 110 for accomplishing clock recovery is shown, in accordance with the preferred and an alternative embodiment of the present invention. In accordance with the alternative embodiment of the present invention, the symbol recovery section 112 is replaced by an analog to digital (A/D) converter. The demodulation signal 105 is coupled to an analog input of the A/D converter and a parallel digital output of the A/D converter is coupled to the bus 125 of the processing system 110. The A/D converter samples the demodulated signal 105 at an oversampling rate of, for example, 16 times the symbol clock rate. In accordance with the alternative embodiment of the present invention, the microprocessor 130 is preferably a digital signal processor, such as one of the family of DSP56000 processors manufactured by Motorola, Inc. of Schaumburg, Ill., although a conventional microprocessor can be used satisfactorily in some situations, partially because the steps are few and simple, requiring few program instructions and clock cycles. The clock recovery element 250 in accordance with the alternative embodiment of the present invention comprises the A/D converter and functions performed by the microprocessor 130, and the ROM 114 includes unique programmed instructions to perform the functions of the clock recovery element 250. The method described hereinafter describes steps used in both the preferred and alternative embodiments of the present invention.

At step 810, the intercepted radiated signal is received by receiver element 104, which generates a demodulated signal 105 at step 820. At step 830, a plurality of received states of the demodulated signal are determined during each symbol period. Each of the received states corresponds to one of the at least two modulation levels. For each state a sign signal having transitions at zero crossing transition times and a magnitude signal are generated. At step 840, selected zero crossing transition times are determined. The selected zero crossing transition times are zero crossing transition times for which the received states substantially one half symbol period before and after each of the selected transition times are of equal magnitudes. At step 850, the selected transition times are used to synchronize the symbol clock. The process is repeated during the receipt of a radiated signal 101.

It will be appreciated that the clock recovery element 250 in accordance with the preferred and alternative embodiments of the present invention works with two level binary signals, although jitter reduction is not provided for a two level signal, because all the zero crossings in a two level system occur at the ideal transition time 301 (FIG. 4). Therefore, the clock recovery element 250 is well suited for use in digital signaling systems in which two level and higher level modulation schemes are mixed, such as in the well-known FLEX™ signaling system licensed by Motorola, Inc. of Schaumburg, Ill.

It will be further appreciated that the unique clock recovery techniques described herein provide an improved recovered symbol clock that, when compared to prior art techniques, has less jitter and yet is simple to implement. When implemented using discrete logic, few gates are needed, and when implemented using programmed instructions, the quantity of instructions needed is small.

We claim:

1. A clock recovery element for recovering a symbol clock having a symbol period from a demodulated signal that includes multilevel digital symbols, wherein each of the multilevel digital symbols has been generated having one of at least two modulation levels, said clock recovery element comprising:

a level decoder for determining one of a plurality of received states of the demodulated signal during each symbol period, wherein each of the plurality of received states corresponds to one of the at least two modulation levels, and wherein said level decoder generates for each of the plurality of received states a sign signal having transitions at central threshold transition times and a magnitude signal that indicates the magnitude of the demodulated signal;

an edge selector, coupled to said level decoder, for determining selected central threshold transition times based on the value of the magnitude signal before and after each transition; and a synchronizable clock, coupled to said edge selector, wherein said synchronizable clock is synchronized by the selected central threshold transition times.

2. The clock recovery element according to claim 1, wherein the selected central threshold transition times of the sign signal are central threshold transition times for which the plurality of received states substantially one half symbol period before and after each of the selected transition times are of equal magnitudes.

3. The clock recovery element according to claim 1, wherein the selected central threshold transition times of the sign signal are central threshold transition times for which the plurality of received states substantially one half symbol period before and after each of the selected transition times are of equal magnitudes which do not include one or more small magnitudes.

4. The clock recovery element according to claim 1, wherein the selected central threshold transition times of the sign signal are crossing transition times for which the plurality of received states substantially one half symbol period before and after each of the selected transition times are of approximately equal magnitudes.

5. The clock recovery element according to claim 1, wherein the selected central threshold transition times of the sign signal are central threshold transition times for which the sign signal has transitioned in a predetermined direction.

6. A radio receiver for recovering a symbol clock having a symbol period from a modulated signal that includes multilevel digital symbols, wherein each of the multilevel digital symbols has been generated having one of at least two modulation levels, said radio receiver comprising:

a receiver element for generating a demodulated signal from the modulated signal;

a clock recovery circuit comprising a level decoder for determining one of a plurality of received states of the demodulated signal during each symbol period, wherein each of the plurality of received states corresponds to one of the at least two modulation levels, and wherein said level decoder generates for each of the plurality of received states a sign signal having transitions at central threshold transition times and a magnitude signal that indicates the magnitude of the demodulated signal;

an edge selector, coupled to said level decoder, for determining selected central threshold transition times based on the value of the magnitude signal before and after each transition; and a synchronizable clock, coupled to said edge selector, wherein said synchronizable clock is synchronized by the selected central threshold transition times; and a latching device, coupled to said synchronizable clock and said demodulated signal, for latching the received states during each symbol period.

7. The radio receiver according to claim 6, wherein the selected central threshold transition times of the sign signal are central threshold transition times for which the plurality of received states substantially one half symbol period before and after each of the selected transition times are of equal magnitudes.

8. The radio receiver according to claim 6, wherein the selected central threshold transition times of the sign signal are central threshold transition times for which the plurality of received states substantially one half symbol period before and after each of the selected transition times are of equal magnitudes which do not include one or more small magnitudes.

9. The radio receiver according to claim 6, wherein the selected central threshold transition times of the sign signal are central threshold transition times for which the plurality of received states substantially one half symbol period before and after each of the selected transition times are of approximately equal magnitudes.

10. The radio receiver according to claim 6, wherein the selected central threshold transition times of the sign signal are central threshold transition times for which the sign signal has transitioned in a predetermined direction.

11. A method used in a receiver for recovering a symbol clock having a symbol period from a demodulated signal that includes multilevel digital symbols, wherein each of the multilevel digital symbols has been generated having one of at least two modulation levels, said method comprising the steps of:

determining one of a plurality of received states of the demodulated signal during each symbol period, wherein each of the plurality of received states corresponds to one of the at least two modulation levels, and wherein for each of the plurality of received states a sign signal is generated having transitions at central threshold transition times and a magnitude signal is generated that indicates the magnitude of the demodulated signal;

determining selected central threshold transition times from the central threshold transition times based on the value of the magnitude signal before and after each transition; and synchronizing a symbol clock by the selected central threshold transition times.

12. The method according to claim 11, wherein the selected central threshold transition times of the sign signal are central threshold transition times for which the plurality of received states substantially one half symbol period before and after each of the selected transition times are of equal magnitudes.

13. The method according to claim 11, wherein the selected central threshold transition times of the sign signal are central threshold transition times for which the plurality of received states substantially one half symbol period before and after each of the selected transition times are of equal magnitudes which do not include one or more small magnitudes.

14. The method according to claim 11, wherein the selected central threshold transition times of the sign signal are central threshold transition times for which the plurality of received states substantially one half symbol period before and after each of the selected transition times are of approximately equal magnitudes.

15. The method according to claim 11, wherein the selected central threshold transition times of the sign signal are central threshold transition times for which the sign signal has transitioned in a predetermined direction.

* * * * *